Oct. 28, 1930. B. WYLAM ET AL 1,779,791
PREPARATION OF A REDDISH DERIVATIVE OF FLAVANTHRONE
Filed April 19, 1926
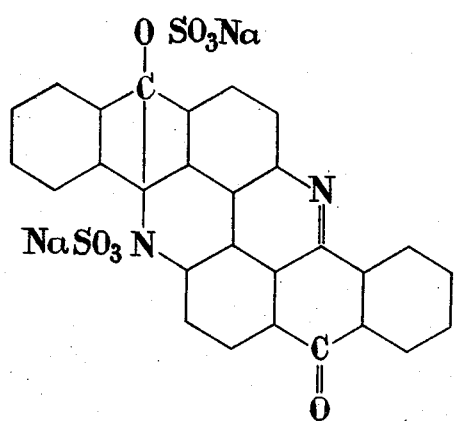
B. Wylam
J. E. T. Harris
and
J. Thomas, INVENTORS
By: Marlin T Cleft
ATTYS.

Patented Oct. 28, 1930

1,779,791

UNITED STATES PATENT OFFICE

BIRKETT WYLAM, OF LANCASTER, AND JOHN EDMUND GUY HARRIS, OF CARLISLE, ENGLAND, AND JOHN THOMAS, OF GRANGEMOUTH, SCOTLAND, ASSIGNORS TO SCOTTISH DYES, LIMITED, OF GRANGEMOUTH, SCOTLAND

PREPARATION OF A REDDISH DERIVATIVE OF FLAVANTHRONE

Application filed April 19, 1926, Serial No. 103,133, and in Great Britain April 30, 1925.

This invention relates to the art of dyeing and to the production of dyes.

The object of the present invention is to provide improved or modified flavanthrone derivatives or improved or modified methods of making flavanthrone derivatives.

The invention in brief consists in a process for producing a reddish flavanthrone derivative comprising the treatment of leuco-flavanthrone with an alkyl sulphuric acid halide, for example methyl sulphuric acid chloride at temperatures above about 50° C., in the presence of a tertiary organic base. The accompanying diagram illustrates what appears to be the structure of the reddish derivative of flavanthrone prepared as herein described.

The following examples illustrate several methods of carrying the invention into effect, all parts unless otherwise specified being parts by weight:—

Example 1

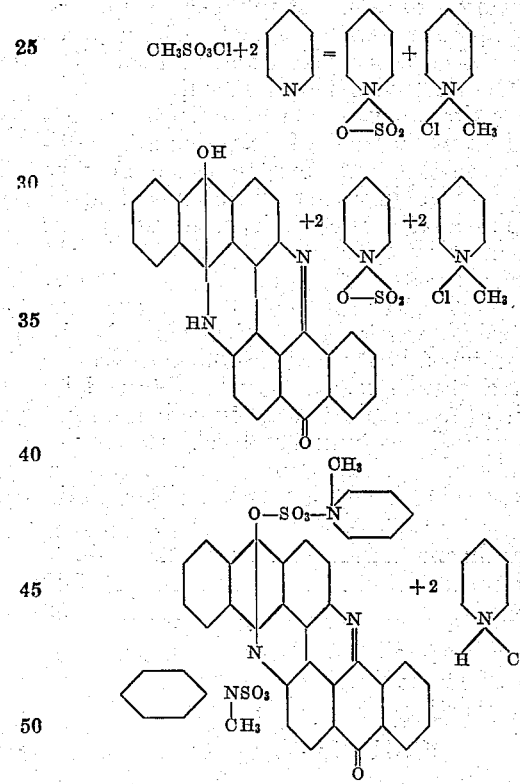

This applies to leuco-flavanthrone and methyl sulphuric acid chloride.

7.5 parts of methyl sulphuric acid chloride are added with stirring and good cooling to 18 parts of dry light pyridine (lower fractions of pyridine liquors obtained in coal tar distillation, of which a typical example is 90/140 pyridine, that is to say, a pyridine of which 90% distils below 140° C.) contained in an apparatus in which there is an atmosphere of carbon dioxide. 3 parts of dry leuco-flavanthrone (prepared by acidifying the flavanthrone vat and drying the precipitate in an inert atmosphere) are now added to the mixture. The temperature is now raised to 60° in the course of about half an hour and kept at 60° for a further half hour. The yellowish red melt is now poured into 200 parts of water containing 8 parts of 0.880 ammonia (that is to say, an aqueous solution of ammonia gas of specific gravity 0.880 and containing approximately 34% of ammonia by weight), whereby a reddish solid is partly precipitated. This may be used directly for dyeing in faintly alkaline solution, under which conditions the dimethyl pyridinium derivative is converted to the corresponding sodium salt. Alternatively it may be dissolved in dilute sodium carbonate solution (1½ per cent. $Na_2CO_3$) aerated to remove unchanged leuco-flavanthrone, filtered, and separated by the addition of salt. A reddish substance is thus precipitated which dissolves in water to form a deep orange red solution that dyes cotton and wool from a slightly alkaline bath a brilliant scarlet colour, which is developed to yellow by means of acid oxidizing agents. This derivative appears to be the disodium salt of the disulphuric acid ester of leuco flavanthrone.

Example 2

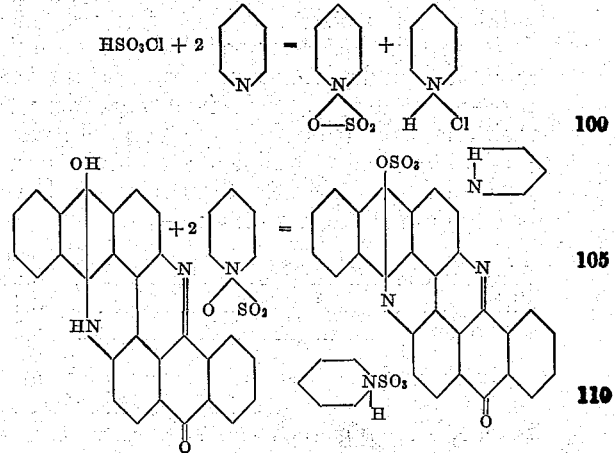

This applies to leuco-flavanthrone and chlor-sulphonic acid.

To 30 parts of pyridine cooled in ice and well stirred are slowly added 10.5 parts of chlor-sulphonic acid. To the mixture are now added 3 parts of dry leuco-flavanthrone. The temperature is raised to 45° and kept at this for 40 minutes. The cooled melt is then added to 200 parts of water containing 9 parts of 0.880 ammonia. The precipitated solid is filtered off and dissolved in 1½ per cent. sodium carbonate solution. A bright red solution is obtained from which a reddish yellow solid may be separated by the addition of common salt. The reddish yellow solid thus precipitated is apparently the disodium salt of the disulphuric acid ester of leuco flavanthrone, the properties of which have been described above in Example 1. Some unconverted leuco compound may also be extracted by the sodium carbonate. This may be removed by aeration prior to salting out. Small amounts of a blue substance, less stable than the red body, may also be produced. This is less soluble than the red substance in dilute sodium carbonate. It also oxidizes on standing in the light and in contact with air and is converted to an insoluble substance (apparently flavanthrone) which may be removed by filtration.

The reddish derivatives of flavanthrone prepared as herein described may be employed for dyeing without the use of vats and may also be employed for printing on any suitable textile fibres or the like.

Tests have been made to determine the constitution of the products prepared by the processes indicated above. In each case two products come into question:—

(1) The products originally present in the melt at the end of the reaction between the leuco compound and the esterifying agent.

(2) The product to which these substances are converted by the action of aqueous alkali.

The product present in the melt of Example 1 and obtained when the yellowish red melt is poured into water containing ammonia, as described, is according to our tests a dimethyl pyridinium derivative of the disulphuric acid ester of leuco flavanthrone. Owing to the instability of this substance, it is liable to undergo decomposition during the processes necessary for its isolation from the melt and separation from accompanying impurities so that it is difficult to obtain accurate analyses. Typical figures which have been obtained are as follows:—

| | Per cent |
|---|---|
| Flavanthrone | 50.64 |
| Sulphur | 6.4 |
| Nitrogen | 5.97 | giving a ratio of 1.54 atoms of sulphur and 3.45 atoms of nitrogen to 1 molecule of flavanthrone, showing that the substance as obtained for analysis was not pure. It is, however, possible to synthesize the dimethyl pyridinium derivative of the disulphuric acid ester of leuco flavanthrone by treating the disodium salt of the disulphuric acid ester with methyl pyridinium iodide. The substance thus obtained may be analyzed, yielding the figures given below. Further, it may be shown by qualitative tests to be identical with the crude product obtained from the melt as described above, which is thus shown to be, in the main, the dimethyl pyridinium derivative of the disulphuric acid ester of dihydro flavanthrone. The analytical figures obtained from this synthetic preparation are as follows:—

| | Per cent |
|---|---|
| Flavanthrone | 54.4 |
| Sulphur | 8.39 |
| Nitrogen | 7.63 |

The calculated composition for $$C_{40}H_{28}N_4O_8S_2$$

is

| | Per cent |
|---|---|
| Flavanthrone | 53.96 |
| Sulphur | 8.46 |
| Nitrogen | 7.27 |

Expressed in another way, 1 molecule of flavanthrone is associated with 1.97 atoms of sulphur and 2.09 atoms of additional nitrogen, the total nitrogen content of the derivative being 4.09 atoms of nitrogen, which result would agree with the view that the product is a disulphuric acid ester, and that it is also the dimethyl pyridinium salt.

In a similar way the crude product obtained from the melt of Example 2 by adding the melt to aqueous ammonia may be shown to be mainly the pyridinium salt of the disulphuric acid ester of leuco flavanthrone. The same difficulties are encountered in obtaining accurate analyses of the crude product of the melt, but this may be shown by various qualitative tests to be identical with the dipyridinium salt of the disulphuric acid ester of flavanthrone which may be obtained by treating the disodium salt of the disulphuric acid ester with pyridine hydrochloride in the presence of excess pyridine. The substance so prepared on analysis was found to contain

| | Per cent |
|---|---|
| Flavanthrone | 48.3 |
| Sulphur | 7.42 |
| Nitrogen | 6.33 |

This corresponds to about 6 molecules of water of crystallization.

The calculated composition for $$C_{38}H_{24}N_4O_8S_2.6H_2O$$

is

| | Per cent |
|---|---|
| Flavanthrone | 48.8 |
| Sulphur | 7.67 |
| Nitrogen | 6.69 |

In the examples shown the crude products of the melt are eventually extracted by warm aqueous alkali, for example 1½% sodium carbonate, whereby the methyl pyridinium and pyridine derivatives described above are converted to the corresponding sodium salt, which are in most cases the most useful forms in which the products may be employed for dyeing.

In order to determine the constitution of these substances the freshly prepared pastes, obtained by extracting the crude condensation product with soda ash, followed by subsequent salting out of the product, was examined.

A given quantity of the paste was treated with a small excess of concentrated hydrochloric acid which decomposes the red product to a bluish-green substance. This was immediately filtered off and the sulphuric acid in the filtrate was determined. The bluish-green substance was then pasted up with water and sodium nitrate and dilute hydrochloric acid added, when flavanthrone was precipitated. This was filtered off and estimated. The sulphuric acid present in the filtrate was determined.

These results showed that in the decomposition of the red salt to the bluish-green substance 1.06 molecules of sulphuric acid were liberated and in the conversion of the green substance by acid oxidation to flavanthrone 0.9 molecules of sulphuric acid were liberated for 1 molecule of flavanthrone, that is, the product may be regarded as a disulphuric acid ester of flavanthrone, viz., the sodium salt, approximate analysis giving a ratio of 1.7 atoms of sodium to 1 molecule of flavanthrone.

Having now described our invention what we claim as new and desire to secure by Letters Patent is:—

1. A method for producing a reddish derivative of flavanthrone which consists in treating leuco flavanthrone at a temperature above about 50° C. and in the presence of a tertiary organic base with a reagent selected from the following, namely an alkyl sulphuric acid halide, and then extracting the melt with a dilute alkali.

2. A process for producing a reddish derivative of flavanthrone which consists in the treatment of leuco flavanthrone in suspension in a liquid tertiary organic amine with an alkyl sulphuric acid halide and extraction of the resultant melt with dilute alkali.

3. A process for the production of a reddish derivative of flavanthrone which consists in treating leuco flavanthrone at a temperature above about 50° C. in the presence of a liquid tertiary organic base with an alkyl sulphuric acid halide and extracting the melt with a dilute alkaline solution.

4. A method for producing a reddish derivative of flavanthrone which consists in treating leuco flavanthrone at a temperature above about 50° C. in the presence of a liquid tertiary organic base with methyl sulphuric acid chloride and extracting the melt with a dilute alkali.

5. A process for producing a reddish flavanthrone derivative which comprises the admixture of an alkyl sulphuric acid halide and a liquid tertiary organic base and the subsequent addition to this mixture of leuco flavanthrone after which the temperature is raised to above about 50° C. and the product extracted by a dilute alkaline solution.

6. A process for producing a reddish flavanthrone derivative comprising the treatment of leuco flavanthrone with an alkyl sulphuric acid halide in the presence of an amount of a liquid tertiary organic base in excess of the quantity corresponding to one molecule of liquid tertiary organic base per molecule of alkyl sulphuric acid halide at a temperature of above about 50° C. and extraction of the product by a dilute alkaline solution.

7. A process for producing a reddish flavanthrone derivative which comprises the admixture of methyl sulphuric acid chloride and pyridine and the subsequent addition to this mixture of leuco flavanthrone after which the temperature is raised to above about 50° C. and subsequently the crude product is extracted by a dilute solution of a sodium salt.

8. A reddish derivative of flavanthrone soluble in water forming a deep orange-red solution and dyeing cotton and wool from a slightly alkaline bath a brilliant scarlet colour which is developed to yellow by means of acid oxidizing agents, this derivative being such as may be prepared by the action of a sulphuric acid halide on leuco flavanthrone in the presence of a liquid tertiary organic base and the product extracted with a dilute alkaline solution.

In testimony whereof we have signed our names to this specification.

BIRKETT WYLAM.
JOHN EDMUND GUY HARRIS.
JOHN THOMAS.